(12) United States Patent
Khafizova

(10) Patent No.: US 9,575,694 B1
(45) Date of Patent: *Feb. 21, 2017

(54) SYSTEMS AND METHODS FOR MANAGING THE EXECUTION OF PRINT JOBS

(71) Applicant: OPEN INVENTION NETWORK LLC, Durham, NC (US)

(72) Inventor: Margarita Khafizova, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,991

(22) Filed: Nov. 13, 2015

Related U.S. Application Data

(63) Continuation of application No. 14/275,129, filed on May 12, 2014, now Pat. No. 9,189,191, which is a continuation of application No. 14/013,706, filed on Aug. 29, 2013, now Pat. No. 8,724,154, which is a continuation of application No. 12/753,180, filed on Apr. 2, 2010, now Pat. No. 8,559,036.

(60) Provisional application No. 61/317,744, filed on Mar. 26, 2010, provisional application No. 61/317,793, filed on Mar. 26, 2010, provisional application No. 61/317,800, filed on Mar. 26, 2010, provisional application No. 61/317,812, filed on Mar. 26, 2010, provisional application No. 61/317,827, filed on Mar. 26, 2010.

(51) Int. Cl.
*G06F 3/12* (2006.01)
*G06K 15/00* (2006.01)

(52) U.S. Cl.
CPC ............ *G06F 3/1204* (2013.01); *G06F 3/1226* (2013.01); *G06F 3/1263* (2013.01); *G06F 3/1288* (2013.01); *G06F 3/1294* (2013.01)

(58) Field of Classification Search
None
See application file for complete search history.

(56) References Cited

U.S. PATENT DOCUMENTS

| | | | | |
|---|---|---|---|---|
| 5,287,194 A | * | 2/1994 | Lobiondo | G03G 15/5083 358/1.15 |
| 5,467,434 A | * | 11/1995 | Hower, Jr. | G06F 3/1205 358/1.13 |
| 8,559,036 B1 | * | 10/2013 | Khafizova | G06F 3/1204 358/1.13 |
| 8,724,154 B1 | * | 5/2014 | Khafizova | G06F 3/1204 358/1.13 |
| 9,189,191 B1 | * | 11/2015 | Khafizova | G06F 3/1204 |

(Continued)

*Primary Examiner* — Dov Popovici
(74) *Attorney, Agent, or Firm* — Haynes and Boone, LLP

(57) ABSTRACT

The illustrative embodiments described herein provide systems and methods for managing the execution of print jobs. In one embodiment, a method includes receiving a print job associated with a set of print job parameters. The print job is sent from a computing device associated with a user. The method includes accessing a set of user parameters associated with the user, and determining a print job priority for the print job using the set of print job parameters and the set of user parameters. The method includes identifying a destination printer capable of executing the print job using the set of print job parameters. The method also includes initiating execution of the print job at the destination printer in response to determining to execute the print job based on the print job priority.

20 Claims, 11 Drawing Sheets

(56) References Cited

U.S. PATENT DOCUMENTS

2003/0011805 A1\* 1/2003 Yacoub ................ G06F 3/1204
358/1.15

\* cited by examiner

| PARAMETER CATEGORY | PARAMETER | NUMERIC VALUE (N) | WEIGHT (W) | WEIGHTED VALUE (X) |
|---|---|---|---|---|
| USER PARAMETER 248 | USER DEPARTMENT = HUMAN RESOURCES | 1 | 2 | 2 |
| | PROJECT NUMBER = 100 | 1 | 5 | 5 |
| | USER JOB COMPLEXITY = HIGHLY COMPLEX | 1 | 1 | 1 |
| PRINT JOB PARAMETER 246 | COLOR OPTION = FULL COLOR | 2 | 3 | 6 |
| | PAGE LAYOUT = LANDSCAPE | 1 | 1 | 1 |
| | URGENCY LEVEL = LOW | 0 | 1 | 0 |
| | WAIT TIME = 24 HOURS | 1 | 1 | 1 |
| | COMPUTING DEVICE = LAPTOP | 1 | 0.1 | 0.1 |
| | PROXIMITY TO PRINTER SERVER = ZONE 3 | 3 | 0.3 | 0.9 |
| | PRINTER TYPE = LASER PRINTER | 0 | 1 | 0 |
| | | | WEIGHTED TOTAL (T): | 17 |

FIG. 5

| PRINT JOB NUMBER | PRINT JOB PRIORITY ($P_k$) | TIME REMAINING UNTIL EXPIRATION OF N | PRINT PENDING TIME PERIOD ($t_k$) | INDIVIDUAL UTILITY FACTOR ($I_k$) |
|---|---|---|---|---|
| 1 | 12 | 1 DAY | 4 DAYS | 12/5 |
| 2 | 10 | 3 DAYS | 2 DAYS | 6 |
| 3 | 5 | 5 DAYS | 0 DAYS | 5 |
| | | | $\Sigma I_k$: | 13.4 |
| | | | CUMULATIVE UTILITY FACTOR (F): | 14.4 |

FIG. 6

SYSTEMS AND METHODS FOR MANAGING THE EXECUTION OF PRINT JOBS

CROSS REFERENCE TO RELATED APPLICATIONS

The present patent application claims priority from and is a continuation of patent application Ser. No. 14/275,129, filed May 12, 2014, entitled SYSTEMS AND METHODS FOR MANAGING THE EXECUTION OF PRINT JOBS, issued U.S. Pat. No. 9,189,191, issued Nov. 17, 2015, which is a continuation of patent application Ser. No. 14/013,706, filed Aug. 29, 2013, entitled SYSTEMS AND METHODS FOR MANAGING THE EXECUTION OF PRINT JOBS, issued U.S. Pat. No. 8,724,154, issued May 13, 2014, which is a continuation of patent application Ser. No. 12/753,180, filed Apr. 2, 2010, entitled SYSTEMS AND METHODS FOR MANAGING THE EXECUTION OF PRINT JOBS, issued U.S. Pat. No. 8,559,036, issued Oct. 15, 2013, which claims priority from provisional patent application No. 61/317,741, filed Mar. 26, 2010, entitled SYSTEM AND METHOD FOR ANALYSING DATA RECORDS UTILIZING A TOUCH SCREEN INTERFACE, and provisional patent application No. 61/317,744, filed Mar. 26, 2010, entitled TOUCH SCREEN COMMANDS, and provisional patent application No. 61/317,793, filed Mar. 26, 2010, entitled A METHOD FOR TOUCH DETECTION IN TOUCH SENSITIVE SCREENS, and provisional patent application No. 61/317,800, filed Mar. 26, 2010, entitled TOUCH SENSITIVE SCREENS UTILIZING HISTORY AND A PREVIEW, and provisional patent application No. 61/317,812, filed Mar. 26, 2010, entitled REPETITIVE TOUCH COMBINING METHOD, and provisional patent application No. 61/317,827 filed Mar. 26, 2010, entitled TOUCH SCREEN ACCURACY, the entire contents of each of these applications are incorporated by reference herein. The instant patent application is related to commonly assigned patent application Ser. No. 12/753,163, filed Apr. 2, 2010, entitled SYSTEMS AND METHODS FOR PRINTING A DOCUMENT FROM A MOBILE COMMUNICATION DEVICE, issued U.S. Pat. No. 8,786,875, issued Jul. 22, 2014, and patent application Ser. No. 12/753,167, filed Apr. 2, 2010, entitled METHOD AND APPARATUS OF COMPILING MULTIMEDIA FILES AND RELATED DATA RETRIEVAL OPERATIONS, and patent application Ser. No. 12/753,171, filed Apr. 2, 2010, entitled METHOD AND APPARATUS OF PROCESSING INFORMATION IN AN ENVIRONMENT WITH MULTIPLE DEVICES AND LIMITED RESOURCES, the entire contents of each of these applications are incorporated by reference herein.

BACKGROUND

Field of the Invention

The present invention relates generally to systems and methods for managing the execution of print jobs. More particularly, the present invention relates to managing print jobs within a network data processing system.

Description of the Related Art

Today, printing is often accomplished in network printing environments. For example, multiple computers and multiple printers may be interconnected via one or more servers so that any one of the computers is able to print to one of the printers in the network. Such printing networks may be found in various locations, such as a home, office, metropolitan area, campus, computer lab, etc. However, issues may arise as the number, size, or diversity of print jobs on a particular network increases. Furthermore, those controlling a network printing environment may desire to manage incoming print jobs according to his or her preferences. Proper management of the print jobs and the network printing environment can address these and other issues that may arise when printing in a network printing environment.

SUMMARY

The illustrative embodiments described herein are directed to a data processing system and, in particular, to systems and methods for managing the execution of print jobs. In one embodiment, a method includes receiving a print job associated with a set of print job parameters. The print job is sent from a computing device associated with a user. The method includes accessing a set of user parameters associated with the user, and determining a print job priority for the print job using the set of print job parameters and the set of user parameters. The method includes identifying a destination printer capable of executing the print job using the set of print job parameters. The method also includes initiating execution of the print job at the destination printer in response to determining to execute the print job based on the print job priority.

In another embodiment, the method includes receiving a print job associated with a set of print job parameters. The print job is sent from a computing device associated with a user. The method includes accessing a set of user parameters associated with the user, associating each of the set of user parameters and each of the set of print job parameters with a respective numeric value (N), and assigning a respective weight (W) to each of the set of print job parameters and each of the set of user parameters. The method also includes determining a respective weighted value (X) for each of the set of print job parameters and each of the set of user parameters, wherein $X = W \cdot N$. The method includes summating the respective weighted values (X) for each of the set of print job parameters and each of the set of user parameters to form a weighted total (T), determining a cumulative utility factor (F) associated with the user, and determining a print job priority (P) for the print job, wherein $P = T/F$. The method also includes initiating execution of the print job at a destination printer using the print job priority (P).

In another embodiment, a data processing system includes a bus system and a memory connected to the bus system. The memory includes a set of instructions. The data processing system includes a processing unit connected to the bus system. The processing unit executes the set of instructions to receive a print job associated with a set of print job parameters and a set of user parameters. The print job is sent from a computing device associated with a user. The processing unit also executes the set of instruction to identify a first set of printers capable of executing the print job based on at least one of the set of print job parameters and the set of user parameters, determine a print job priority based on the set of print job parameters and the set of user parameters, identify a second set of printers capable of executing the print job based on the print job priority, and identify one or more printers included in both the first set of printers and the second set of printers to form a set of available printers. Each of the set of available printers has a respective load, and the respective load of each of the set of available printers is an amount of time remaining for the respective available printer to complete execution of print jobs scheduled for the respective available printer. The processing unit also executes the set of instruction to identify a destination printer having a lowest load in the set of available printers, and initiate execution of the print job at the destination printer.

BRIEF DESCRIPTION OF THE DRAWINGS

FIG. 5 is a table containing user and print job parameters, as well as values associated therewith, according to an illustrative embodiment;

FIG. 6 is a table containing the job number, job priority, and other values describing a set of pending print jobs associated with a user according to an illustrative embodiment;

DETAILED DESCRIPTION

Figure 1:
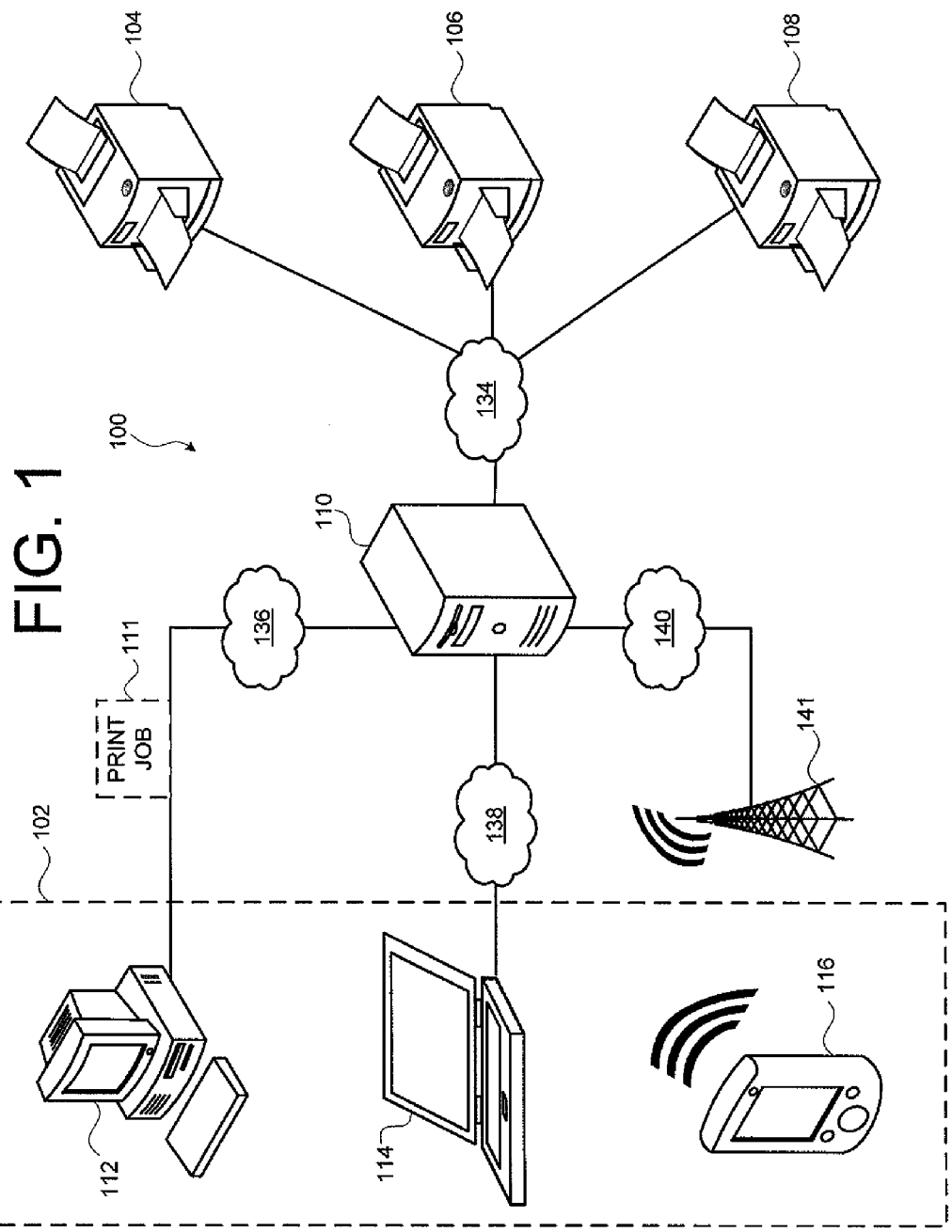
FIG. 1 is a schematic, pictorial representation of a network data processing system for managing the execution of print jobs according to one illustrative embodiment.
Figure 2:
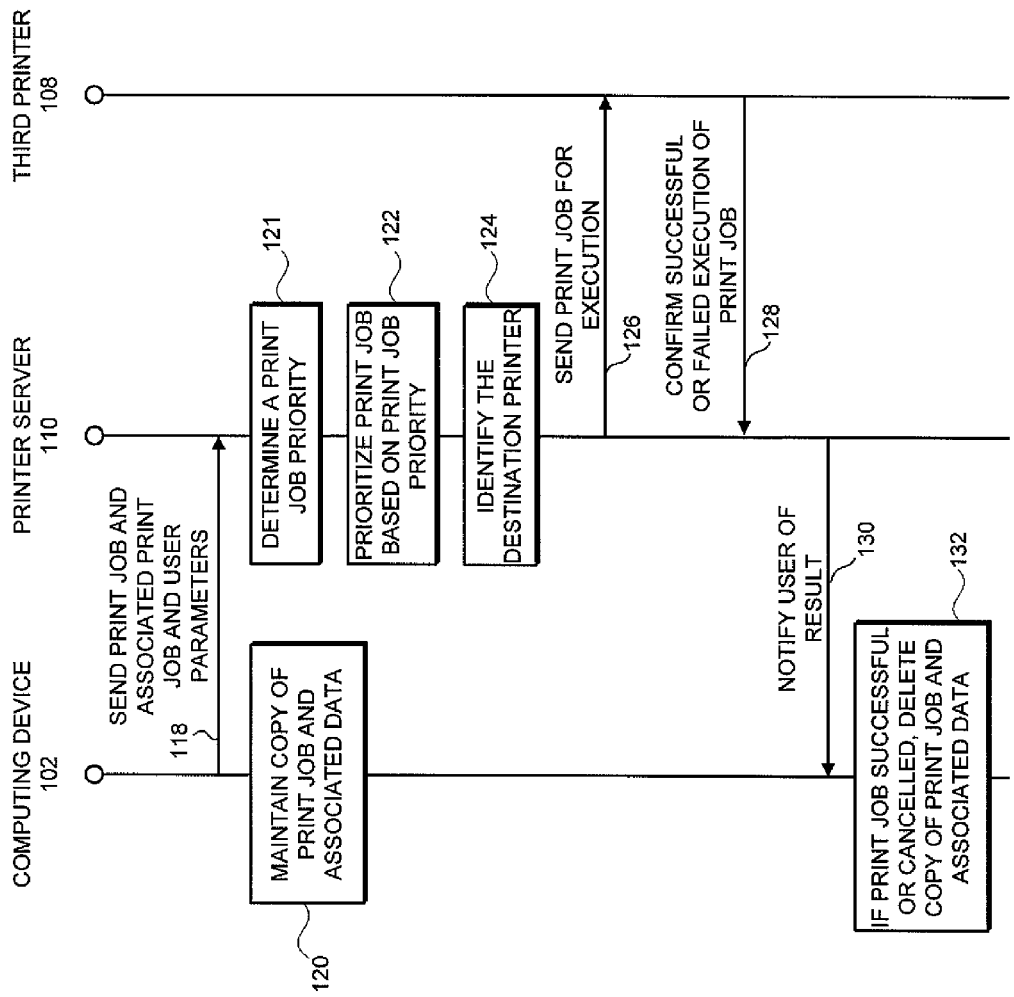
FIG. 2 is a schematic diagram showing an illustrative embodiment of the interaction between components of a system for managing the execution of print jobs.

Referring to FIGS. 1 and 2, an illustrative embodiment of a printer network 100 includes computing devices 102 that are in data communication with a first printer 104, a second printer 106, and a third printer 108 via a printer server 110. The computing devices 102 may include any device capable of sending, or otherwise initiating, a print job. Unless otherwise indicated, as used herein, "or" does not require mutual exclusivity. A print job may include any files, instructions, or other data that is sendable or usable to print a document at a printer. In the non-limiting example of FIG. 1, the computing devices 102 include a desktop computer 112, a laptop computer 114, and a cellular phone 116. Other non-limiting examples of the computing devices 102 include smart phones, walkie talkies, netbooks, personal digital assistants, mini-computers, digital music players, portable gaming devices, web browsing devices, etc. Also, any number of printers or computing devices, of any type, may be included in the network data processing system 100.

In one embodiment, the computing devices 102 send one or more print jobs 111 to the printer server 110, which may then prioritize the incoming print jobs using one or more parameters that are associated with the print job 111. In the non-limiting example of FIG. 1, the desktop computer 112 is shown to be sending the print job 111 to the printer server 110, although the print job 111 may originate from any of the computing devices 102. In addition to prioritizing the print jobs received from the computing devices 102, the printer server 110 may also identify a destination printer based on parameters associated with the incoming print jobs, the print job priority accorded to any one of the incoming print jobs, or other factors.

With particular reference to FIG. 2, an illustrative embodiment of the interaction between the components of FIG. 1 is shown in which the computing devices 102 (e.g., the desktop computer 112) send the print job 111 and associated print job parameters and user parameters to the printer server 110 (data communication 118). Print job parameters include any data describing, or otherwise associated, with the print job 111. User parameters include any data describing, or otherwise associated, with a user of the computing device sending the print job 111. Print job and user parameters are described in further detail below, with reference to specific non-limiting examples.

After sending the print job 111, the computing device 102 may retain a copy of the print job 111 and any associated data in storage, including the associated print job and user parameters (process 120). After receiving the print job 111 and any associated parameters, the printer server 110 may then determine a print job priority for the print job (process 121). The printer server 110 may use the print job and user parameters associated with the print job 111 in order to determine the print job priority. If other print jobs are currently pending in the printer network 100, a printer server 110 may then prioritize the print job 111 relative to the other pending print jobs to determine an execution order for scheduling the print jobs (process 122). In process 122, a printer server 110 may prioritize the pending print jobs using the respective print job priorities of the pending print jobs. For example, pending print jobs with the highest print job priorities may be scheduled to be executed first in the execution order, while pending print jobs with the lowest print job priorities may be scheduled to be executed last in the execution order. Additional details regarding the determination of the print job priority for a particular print job, as well as the prioritization of print jobs based on the print job priority, will be described in further detail below.

The printer server 110 may also identify a destination printer at which to initiate execution of the print job 111 (process 124). In the example of FIGS. 1 and 2, the third printer 108 is identified to be the destination printer. The identification of the destination printer in process 124 may occur in parallel or in series with the processes 121 or 122. Also, the identification of the destination printer may be performed using the print job or user parameters associated with the print job 111. The print job priority of the print job 111 may also be used to identify the destination printer. For example, the destination printer may be identified in response to a determination that the print job 111 is ready to be scheduled based on the print job priority of the print job 111. Additional details regarding identifying the destination printer are described below.

In one embodiment, after identifying the third printer 108 as the destination printer, the printer server 110 sends the print job 111 to the third printer 108 for execution (data communication 126). The print job 111 may also be sent to the third printer 108 from a source other than the printer server 110, in which case the printer server 110 initiates execution of the print job 111 at the third printer 108. Depending upon whether the third printer 108 successfully executes the print job 111, the third printer 108 may then confirm whether the print job 111 was successfully executed (data communication 128). The printer server 110 may then notify the user as to whether the print job 111 was successfully executed (data communication 130).

In one embodiment, as described in further detail below, the printer server 110, when informed that the print job 111 was not successfully executed, may determine a cause for the failure of the print job 111 to execute. The printer server 110 may then notify the user of the cause for failure, or may analyze the cause for failure and send a suggested action to the user. In another embodiment, the printer server 110 notifies the computing device 102 of the cause for failure, and the computing device 102 may analyze the cause for failure and notify the user of a suggested action.

If the computing device 102 is notified that the print job 111 was successfully executed, the computing device 102 may delete the print job 111 and any associated data that resides on the computing device 102. The computing device 102 may also delete the print job 111 and associated data if the print job 111 was canceled by the user (process 132).

The illustrative embodiments may be used to accommodate the scheduling of print jobs when the number of printers, or other processing resources, is relatively limited. Further, the illustrative embodiments may be used to schedule print jobs using definable settings that reflect the prioritization and printing preferences of a user, organization, or other entity that manages print jobs within a printer network. Indeed, the illustrative embodiments may be used in any number of ways to accommodate a wide variety of purposes.

The techniques, technologies, or media by which the components of the printer network 100 intercommunicate are numerous. For example, the printer network 100, or any portion thereof, may be part of a personal area network (PAN), a local area network (LAN), a campus area network (CAN), a metropolitan area network (MAP), or any other network type. Also, data communication medium 134 between the printer server 110 and each of the first printer 104, the second printer 106, and the third printer 108, respectively, may be any medium through which data can be communicated. For example, the data communication medium 134 may be wired or wireless data connections, and may utilize a virtual private network (VPN), multi-protocol label switching (MPLS), the Internet, or any other data communication media. In addition, the printer server 134 may communicate with each of the first printer 104, the second printer 106, and the third printer 108 using a separate or different medium.

The data communication media 136, 138, and 140 between the printer server 110 and each of the desktop computer 112, the laptop computer 114, and the base station 141, respectively, may be of the same or similar type as any of the non-limiting examples provided for the data communication medium 134. In addition to the printer server 110, additional intervening servers may facilitate data communication between the computing devices 102 and the first, second, and third printers 104, 106, and 108. In one embodiment, the intervening servers may store one or more document associated with the print job 111, and the document may be retrieved from these intervening servers so that the document can be printed. In another embodiment, the document to be printed, as indicated by the print job 111, may be sent along with the print job 111 to the printer server 110.

Wireless communication between the cellular phone 116 and the base station 141 may utilize any wireless standard for communicating data, such as CDMA (e.g., cdmaOne or CDMA2000), GSM, 3G, Edge, an over-the-air network, Bluetooth, etc.

In one example, the printer network 100 may utilize the Internet, with any combination of the data communication media 134, 136, 138, and 140 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Referring to FIGS. 3-7, an illustrative embodiment of a print management system 242 includes a print manager 244 that receives the print job 211 from the computing device 202. The print manager 244 prioritizes the print job 211 relative to other pending print jobs managed in the print management system 242. The print manager 244 may also initiate execution of the print job 211 at the destination printer 208, which is identified by the print manager 244. Components of FIG. 3 that are analogous to components in FIGS. 1 and 2 have been shown by indexing the reference numerals by 100. The print manager 244 may be implemented by a printer server, such as the printer server 110 in FIG. 1, or may be implemented by the computing device 202.

The computing device 202 may send the print job 211 to the print manager 244 along with one or more print job parameters 246. One or more user parameters may also be sent from the computing device 202 to the print manager 244. In another embodiment, the print manager 244 may access a user profiles database 250 to retrieve the user parameters 248.

In one embodiment, the print job parameters 246 or the user parameters 248 are determined or defined, at least in part, by a print interface application 252. The print interface application 252 may be included as part of another print-capable application, such as a word processor, a graphical-related application, a spreadsheet application, a Web browser, or other print-capable application. The print interface application 252 may also be a separate application that works in conjunction with another print-capable application.

Figure 4:
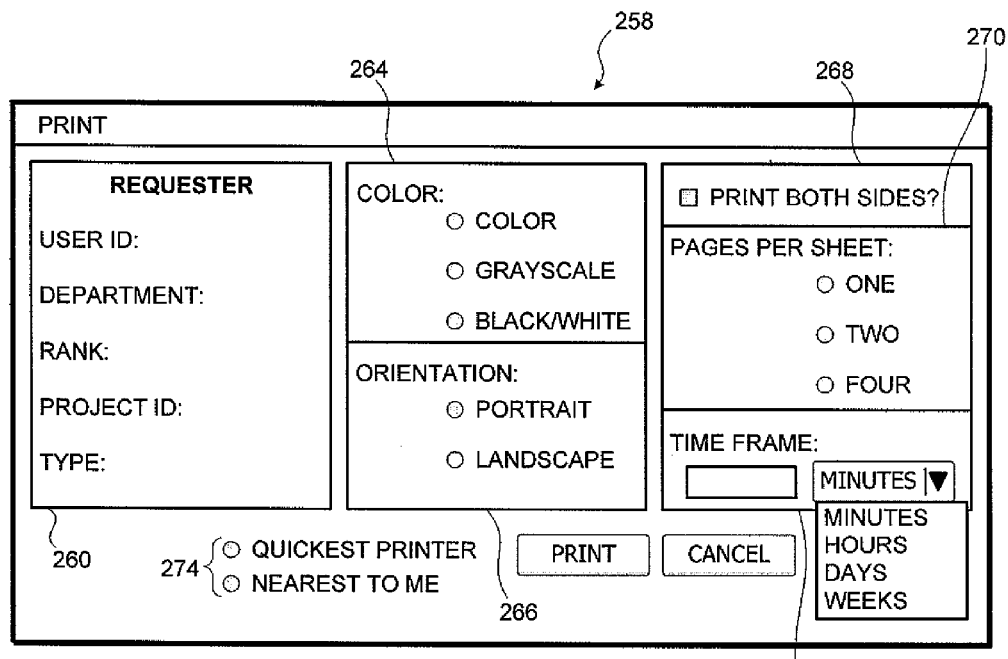
FIG. 4 is a schematic, pictorial representation of a print prompt for display to a user according to an illustrative embodiment.
Figure 7:
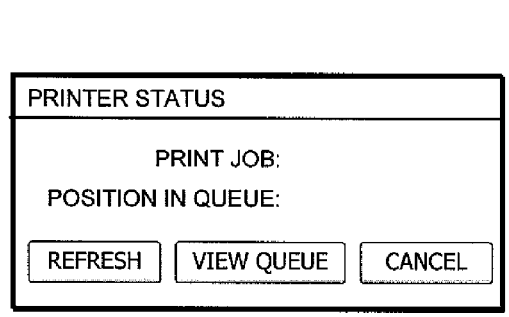
FIG. 7 is a schematic, pictorial representation of a printer status prompt for display to a user according to an illustrative embodiment.

The print interface application 252 may prompt a user 254 to input the print job parameters 246 or the user parameters 248. The print interface application 252 may prompt the user 254 using a print prompt that is displayed on a graphical user interface 256. A non-limiting example of a print prompt 258 is shown in FIG. 4.

The print prompt 258 is capable of receiving input from the user 254 regarding the print job parameters 246 and the user parameters 248. In one embodiment, the print prompt 258 includes a requestor, or user, portion 260 that displays one or more of the user parameters 248. In the example of FIG. 4, the requester portion 260 includes a user ID associated with the user 254, a department that is associated with the user 254, the rank of the user 254, a project ID of the project on which the user 254 is working, and a type of document 262 or project on which the user 254 is working. The user parameters in the requestor portion 260 of the print prompt 258 may be inputted by the user 254, or may already be stored in the computing device 202 and displayed on the print prompt 258.

Various print job parameters 246 are also displayed and selectable in the print prompt 258. The print prompt 258 includes a color selection portion 264 that allows the user 254 to select a color for printing the document 262. In the non-limiting example of FIG. 4, the color selection portion 264 includes a color option, a grayscale option, and a black-and-white option. The print prompt 258 also includes an orientation selection portion 266 that allows the user 254 to select an orientation (e.g., portrait or landscape) for the document 262.

The user 254 may also select whether to print the document 262 on one or both sides of each sheet in a print-side selection portion 268. The user 254 may also select the number of pages to be printed on each sheet (e.g., one, two, or four) in a pages-per-sheet selection portion 270. A time frame selection portion 272 allows the user 254 to indicate a time at which to print the document 262. For example, the user 254 may enter an expected pickup time of two hours in the time frame selection portion 272, thereby indicating that the user 254 expects to retrieve the document 262 from the destination printer 208 in approximately two hours. The time frame entered by the user 254 in the time frame selection portion 272 may also be inputted as a time and date. The user 254 may also indicate whether he or she would like to print manager 244 to find the quickest printer at which to print the document 262 or the printer that is nearest to the user 254 by using radio buttons 274.

The layout of the print prompt 258, and the user parameters 248 and the print job parameters 246 that are displayed therein, are by way of example only. For example, the print prompt 258 may indicate any combination of the user parameters 248, or none at all.

In one embodiment, the print job parameters 246 and the user parameters 248 are stored in either or both of the computing device 202 or the print manager 244. In this example, the print job parameters 246 or the user parameters 248 may be stored as default settings so that the user 254 does not have to indicate the print job parameters 246 and the user parameters 248 each time a print job is initiated.

In addition to the print job parameters 246 and the user parameters 248 displayed in the print prompt 258, numerous other print job parameters 246 and user parameters 258 may be associated with the print job 211 and used by the print manager 244. For example, the print job parameters 246 may indicate a printer type, such as a laser printer, a dot-matrix printer, a plotter, an inkjet, etc. The print job parameters 246 may also include, or otherwise indicate, the urgency of the print job 211. The urgency may be selected by the user 254, or may be pre-defined based on another print job or user parameter. In another embodiment, the print job parameters 246 may indicate a location of the computing device 202. For example, the print job parameters 246 may indicate a particular "zone" in which the computing device 202 is located, and this zone may be used to identify the destination printer 208 that is proximate the computing device 202. In one example, the computing device 202 may be in any one of multiple zones, and each of the zones may correspond to a range of distance from a printer server (e.g., 0-5 feet, 6-20 feet, 21-40 feet, etc.).

Any other print job data that describes any aspect of the print job 211 may also be included with the print job parameters 246. Likewise, the user parameters 248 may include any data that describes, or otherwise relates, to the user 254 or the computing device 202, such as the print preferences of the user 254, passwords to access printing on a particular printer, the maximum distance the user 254 is willing to travel to retrieve the document 262, any type of user identification data, user financial information, the specific type of computing device (e.g., laptop, cell phone, etc.), and any other user or computer device-related data.

In one embodiment, a prioritization engine 275 determines a print job priority 276 using the print job parameters 246 and/or the user parameters 248. The print job priority 276 may be used to prioritize the print job 211 relative to other pending print jobs managed by the print manager 244. The determination of the print job priority 276 by the prioritization engine 275 is described with reference to the table 277 in FIG. 5. The table 277 is a specific and non-limiting example of the parameters and values that may be used to calculate the print job priority 276. The parameters and values shown in the table 277 may be varied, added to, or subtracted from in numerous ways that would alter the determination of the print job priority 276.

In one illustrative embodiment, the prioritization engine 275 assigns, or otherwise associates, each of the print job parameters 246 and the user parameters 248 with a respective numeric value N. The numeric value N is indicative of the print job parameter 246 or the user parameter 248. For example, for the user department parameter shown in the table 277, the respective numeric value N may differ depending on the particular department that is indicated by the parameter. In the example of the table 277, the numeric value N of one (1) is assigned to indicate that the user department is the human resources department. Other departments may have other numeric values.

By way of further example, the numeric value N of two (2) has been assigned to the color option parameter to indicate that the document 262 is to be printed in full-color. If the color option parameter were set to indicate grayscale or black-and-white, then the numeric value N for the color option parameter may be three (3) or four (4), respectively. In the example of the table 277, several other numeric values N have been assigned to corresponding user parameters 248 and print job parameters 246. For example, a numeric value N of one (1) has been assigned to the project number parameter to indicate a project number of 100, a numeric value N of one (1) has been assigned to the user job complexity parameter to indicate a highly complex job, a numeric value N of one (1) has been assigned to the page layout parameter to indicate a landscape layout, a numeric value N of zero (0) has been assigned to the urgency level parameter to indicate a low urgency level, a numeric value N of one (1) has been assigned to the wait time, or expected pickup time, parameter to indicate a wait time of 24 hours, a numeric value N of one (1) has been assigned to the computing device parameter to indicate that a laptop is the computing device 202, a numeric value N of three (3) has been assigned to the proximity to printer server parameter to indicate that the computing device 202 is located in zone three, and a numeric value N of zero (0) has been assigned to the printer type parameter to indicate that a laser printer is being used to print the document 262. In one embodiment, the higher the numeric value N that is assigned to the print job parameter 246 or the user parameter 248, the more weight that print job parameter or user parameter will be accorded when determining the print job priority 276.

The prioritization engine 275 may also assign a weight W to each of the print job parameters 246 and the user parameters 248. The weight W may be used to determine the impact that each of the print job parameters 246 and the user parameters 248 will have on the print job priority 276. For example, the higher the weight W is for a particular print job or user parameter, the more that print job or user parameter will cause the print job priority 276 to have a higher value.

The weights W for each print job and user parameter may be preconfigured to reflect the preferences of any user or entity managing print jobs using the print manager 244. For example, print job or user parameters that the user or entity considers important when prioritizing the print job 211 may assign those particular print job or user parameters a higher weight W. In the example of the table 277, the project number parameter and the color option parameter have been given respective weights W of five (5) and three (3), respectively, which are the highest weights W in the table 277. Thus, the project number parameter and the color option parameter may be considered to be the most important in determining the print job priority 276. On the other hand, the computing device parameter and the proximity to printer server parameter have the lowest respective weights W of 0.1 and 0.3, respectively. Thus, the computing device parameter and the proximity to printer server parameter may be considered to be the least important when determining the print job priority 276. In another embodiment, the weights W of one or more of the print job parameters 246 or the user parameters 248 may be dynamically adjusted in real time to reflect current circumstances, such as the availability of printers with certain capabilities, the importance of the project that the user 254 is currently working on, etc.

The prioritization engine 275 may also determine a weighted value X for each of the print job parameters 246 and the user parameters 248 by multiplying the respective numeric value N by the respective weight W for each of the print job parameters 246 and user parameters 248. Thus, as expressed in formulaic, or symbolic, terms, X=W·N. By way of representative example in the table 277, the respective weighted value X for the user department parameter is determined to be two (2), which is the product of the respective numeric value N of one (1) and the respective weight W of two (2). By way of further example, the weighted value X of the proximity to printer server parameter is determined to be 0.9, which is the product of the respective numeric value N of three (3) and the respective weight W of 0.3.

The prioritization engine 275 may then determine a weighted total T by summing the weighted values X for all of the print job parameters 246 and the user parameters 248, or T=ΣX. In the example of the table 277, the weighted values X of the print job parameters 246 and the user parameters 248 add up to equal a weighted total T of 17.

In one embodiment, the weighted total T may be used as the print job priority 276 when the user 254 has no pending print jobs other than the print job 211. In this embodiment, if the user 254 is determined to have no pending print jobs other than the print job 211, then the print job priority 276 is equal to the weighted total T. Thus, the print job priority 276 may equal the weighted total T of 17 if the user 254 has no pending print jobs other than the print job 211.

In another embodiment, the user 254 may have initiated print jobs other than the print job 211, and which are currently pending. In this embodiment, the prioritization engine 275 may determine a cumulative utility factor F for the user 254, and divide the weighted total T by the cumulative utility factor F to equal the print job priority 276. The cumulative utility factor F, in one embodiment, is a fairness mechanism that adjusts the print job priority 276 based on the print jobs that the user 254 has initiated other than the print job 211. In this embodiment, the cumulative utility factor F may be used to prevent the user 254 from over-utilizing the printers in the print management system 242 at the expense of other users.

In one embodiment, to calculate the cumulative utility factor F, the prioritization engine 275 identifies the pending and prioritized print jobs 279 that have been initiated by the user 254. The pending and prioritized print jobs 279 are one or more pending print jobs initiated by the user 254 other than the print job 211. For purposes of illustration only, determination of the cumulative utility factor F is described with reference to FIG. 6, which includes a table 278 of pending and prioritized print jobs 279 initiated by the user 254. The table 278 includes data about each of the pending and prioritized print jobs 279. In particular, the table 278 includes the print job number, the print job priority $P_K$, the time remaining until the expiration of a predetermined time period N, and the print pending time period $t_K$ for each of the pending and prioritized print jobs 279. N is a predetermined time period that may be selected or defined by a user or entity that is using the print manager 244 to manage print jobs. In the non-limiting example of the table 278, the predetermined time period N is equal to five days. However, the predetermined time period N may be on the order of seconds, minutes, weeks, months, or any other time. The print pending time period $t_K$ is an amount of time that the respective pending and prioritized print job 279 has been pending.

In one embodiment, the data for the pending and prioritized print jobs 279, such as the data in the table 278, may be retrieved using a unique identifier UI for the user 254. The unique identifier UI for the user 254 may include a user ID for the user 254, the department of the user 254, the location of the user 254, and other user data or parameters. When finding print jobs initiated by the user 254, the prioritization engine 275 may search for the pending and prioritized print jobs 279 using the user's unique identifier UI, which may be included with, or otherwise associated with, each of the pending and prioritized print jobs 279.

The prioritization engine 275 determines an individual utility factor $I_K$ for each of the pending and prioritized print shops 279, wherein $I_K=P_K(N-t_K)/N$. In one example, the respective individual utility factor $I_K$ for each of the pending and prioritized print jobs 279 may be determined in accordance with the equation $I_K=P_K(N-t_K)/N$ by dividing a respective print job priority $P_K$ by the predetermined time N to form a first intermediate value. A second intermediate value may be determined by subtracting the respective print pending time period $t_K$ for the pending and prioritized print job from the predetermined time N. The second intermediate value may also be determined by identifying an amount of time remaining until the pending and prioritized print job has been pending for the predetermined time N; such an amount of time is shown in the column of the table 278 labeled "Time remaining until expiration of N". The individual utility factor $I_K$ for each of the pending and prioritized print jobs 279 may then be determined by multiplying the first intermediate value by the second intermediate value for each of the pending and prioritized print jobs 279.

In the example of the table 278, the individual utility factors $I_K$ for print job numbers one (1), two (2), and three (3) are 12/5, six (6), and five (5), respectively. The individual utility factors $I_K$ for the pending and prioritized print jobs 279 may then be summated, and then incremented by one (1) to form the cumulative utility factor F. In one example, the cumulative utility factor F may be expressed as: $F=1+\Sigma_{n=1}^{K} I_K$, wherein K is the number of pending and prioritized print jobs 279. The number of pending and prioritized print jobs K may be determined by the prioritization engine 275. In the non-limiting example of the table 278, the number of pending and prioritized print jobs K is equal to three (3), and the cumulative utility factor F is 14.4.

The weighted total T for the print job 211 may then be divided by the cumulative utility factor F associated with the user 254 to form the print job priority 276. In the non-limiting example of FIGS. 5 and 6, the weighted total T of 17 is divided by the cumulative utility factor F of 14.4 to equal 1.18. Thus, in the example of FIGS. 5 and 6, the print job priority 276 is 1.18.

In one embodiment, the prioritization engine 275, upon determining the print job priority 276 for the print job 211, may prioritize the print job 211 relative to the other pending print jobs managed by the print manager 244. These other pending print jobs may include print jobs that are initiated by the user 254, and those that are not. In one example, the prioritization engine 275 may determine an execution order for the pending print jobs by comparing the respective print job priorities for all of the pending print jobs managed by the print manager 244. In this example, the pending print jobs may be arranged in descending order based on the print job priorities so that the pending print jobs with higher print job priorities are scheduled to be printed before those with lower print job priorities. Thus, if the print job priority 276 of the print job 211 is greater than a print job priority of another print job that is pending in the print manager 244, then the print job 211 will be scheduled to be printed prior to the other print job.

The position of the print job 211 in the execution order, or queue, may be displayed to the user 254 using a printer status prompt 280 on the graphical user interface 256. The printer status prompt 280 may also display the print job identifier of the print job 211, and may allow the user 254 to view the execution order, or queue, in which the print jobs managed by the print manager 244 are scheduled. The printer status prompt 280 also allows the user 254 to refresh the printer status prompt 280, and therefore update the "Position in Queue" field to reflect changes in the execution order of the print jobs managed by the print manager 244.

In one embodiment, a printer identification module 282 identifies the destination printer 208 on which the print job 211 is to be executed. For example, once the print manager 244 determines to execute the print job 211 based on the print job priority 276, and resultant position in the execution order, the printer identification module 282 may then identify the destination printer 208 that is capable of performing the print job 211 based on the user parameters 248 and the print job parameters 246 associated with the print job 211. By way of specific example, if the print job parameters 246 indicate that the print job 211 is to be printed in full color and on a laser printer, then the printer identification module 282 identifies the destination printer 208 that is a color laser printer. By way of further example, if the print job parameters 246 indicate an expected pickup time of 48 hours from the time the print job 211 is initiated, the prioritization engine 275 may prioritize the print job 211 accordingly, and the printer identification module 282 may identify the destination printer 208 that is capable of executing the print job 211 prior to, or at, the expected pickup time of 48 hours from the time of initiation.

In another embodiment, each of the potential printers that are evaluated by the printer identification module 282 has a respective load. The load is an amount of time that it would take for the respective printer to complete execution of the print jobs that are scheduled for that respective printer. Thus, when the print job 211 is scheduled for execution, as determined by the print job priority 276, the printer identification module 282 may identify the destination printer 208 with the lowest load. Identifying the destination printer 208 with the lowest load enables the print job 211 to be executed as quickly as possible upon being scheduled for execution.

In another embodiment, the printer identification module 282 may identify two or more sets of printers based on differing criteria, and identify a destination printer that is included in each of these identified sets of printers. For example, the printer identification module 282 may identify a first set of printers 284 that is capable of performing the print job 211 based on the print job parameters 246 and the user parameters 248. By way of example, if the print job parameters 246 of the print job 211 indicate that the document 262 should be printed on both sides of each sheet, then the printer identification module 282 will identify the first set of printers 284 that has duplexing or double-sided printing capability. In another example, if the print job parameters 246 indicate that the expected pickup time of the document 262 is in three hours from the time of initiation, then the printer identification module 282 will identify the first set of printers 284 that is able to execute the print job 211 in approximately 3 hours.

The printer identification module 282 may also identify a second set of printers 286 that is able to print the print job 211 based on the print job priority 276 of the print job 211. For example, if the print job priority 276 is a large value when compared to the other print job priorities of the other pending print jobs in the print manager 244, the printer identification module 282 may identify the second set of printers 286 that is available for immediate, or close to immediate, execution of the print job 211. The first set of printers 284 and the second set of printers 286 may each include one or printers.

The identification of the first set of printers 284 and the second set of printers 286 by the printer identification module 282 make occur in parallel. In another embodiment, the first set of printers 284 may be identified before or after the second set of printers 286 is identified so that the two identification processes occur in series.

The printer identification module 282 may then identify an available set of printers 288 that are included in both the first set of printers 284 and the second set of printers 286. Of the printers in the available set of printers 288, the printer identification module 282 may identify the destination printer 208 having the lowest load. The printer identification module 282 may also use the user parameters 248 or the print job parameters 246 to determine the destination printer 208 in the available set of printers 288. In the case in which the printer identification module 282 fails to find any printer in one of the first set of printers 284 or the second set of printers 286, then the printer identification module 282 may attempt to find the destination printer 208 in the other of the first set of printers 284 or the second set of printers 286.

Upon identifying the destination printer 208, the print manager 244 may initiate the print job 211 at the destination printer 208 so that the associated document 262 may be printed. The document 262 may then be retrieved by the user 254 or other person. Upon successful execution of the print job 211 at the destination printer 208, the print manager 244 may receive confirmation from the destination printer 208 that the print job 211 was successfully executed. In response to receiving this confirmation of successful execution of the print job 211, the print manager 244 may initiate a notification on the computing device 202 that the print job 211 has been successfully executed.

In some cases, the destination printer 208 may fail to print the document 262 for a variety of reasons. In one embodiment, a diagnostic and notification engine 290 may determine a cause for the failure of the print job 211 to properly execute. The diagnostic and notification engine 290, or an application in the computing device 202, may analyze the cause of failure that is determined by the diagnostic and notification engine 290 and determine a suggested action for overcoming the cause of failure. For example, the print job parameters 246 may indicate that the print job 211 should be executed on a color printer, and the printer identification module 282 may be unable to locate any color printer on which to execute the print job 211. In this case, the printer identification module 282 may notify the diagnostic and notification engine 290 that no printers are available for color printing, and the diagnostic and notification engine 290 may suggest to the user 254 to change or loosen the requirement that the print job 211 be printed on a color printer. In response, the user 254 may indicate that the print job 211 may be printed in black and white, in which case the printer identification module 282 may be able to locate a suitable printer for execution of the print job 211.

In another example, the print job parameters 246 may be incompatible with one another, resulting in a failure of the print job 211 to execute. To take a specific example, the print job parameters 246 may indicate that the print job 211 should be printed on two sides of each sheet on a dot-matrix printer. Since dot-matrix printers do not have duplexing or double-sided printing capability, the print manager 244 may notify the diagnostic and notification engine 290 that the print job parameters 246 are not compatible with one another, and notify the user 254 as such. The user 254 may then be prompted to change the incompatible print job parameters 246 to eliminate the cause of failure.

In another example, the destination printer 208 or the available set of printers 288 may have become unavailable before the print job 211 could be executed, or the print manager 244 may have lost a data connection with the destination printer 208. In this case, the diagnostic and notification engine 290 may inform the user 254 of such failure. The diagnostic and notification engine 290 may also suggest to the user 254 to resubmit the print job 211 at a later time. At this point, the user 254 may decide to change the print job parameters 246 or even cancel the print job 211 altogether. The print manager 244 may also wait for a user response for a predetermined time, and resubmit the print job 211 to a different printer server upon expiration of the predetermined time. The diagnostic and notification engine 290 may also suggest to the user 250 that the print job 211 should be submitted to a printer server other than the one on which the print manager 244 is being implemented.

In another example, only a portion of the print job 211 may have been executed by the destination printer 208, while the remainder of the print job 211 is unable to be executed for any reason. In this case, the diagnostic and notification engine 290 may inform the user 254 of the partial failure and suggest that the remainder of the print job 211 be executed without re-executing the completed portion of the print job 211. In one embodiment, if the user 254 does not respond within a predetermined time, the print job 211 will be resubmitted to a different printer server than the one on which the print manager 244 is being implemented.

In another example, the print job parameters 246 may indicate an expected pickup time for the print job 211, but no printers may be identifiable that are able to print the document 262 within or at the expected pickup time. In this case, the diagnostic and notification engine 290 may notify the user 254 that no printer will be available at the expected pickup time. The user 254 may then be presented with the option to change the expected pickup time, or even cancel the print job 211 altogether. In addition to the examples given above, other causes of failure for the print job 211 to execute at the destination printer 208 are possible, and the illustrative embodiments may incorporate these as well.

Figure 3:
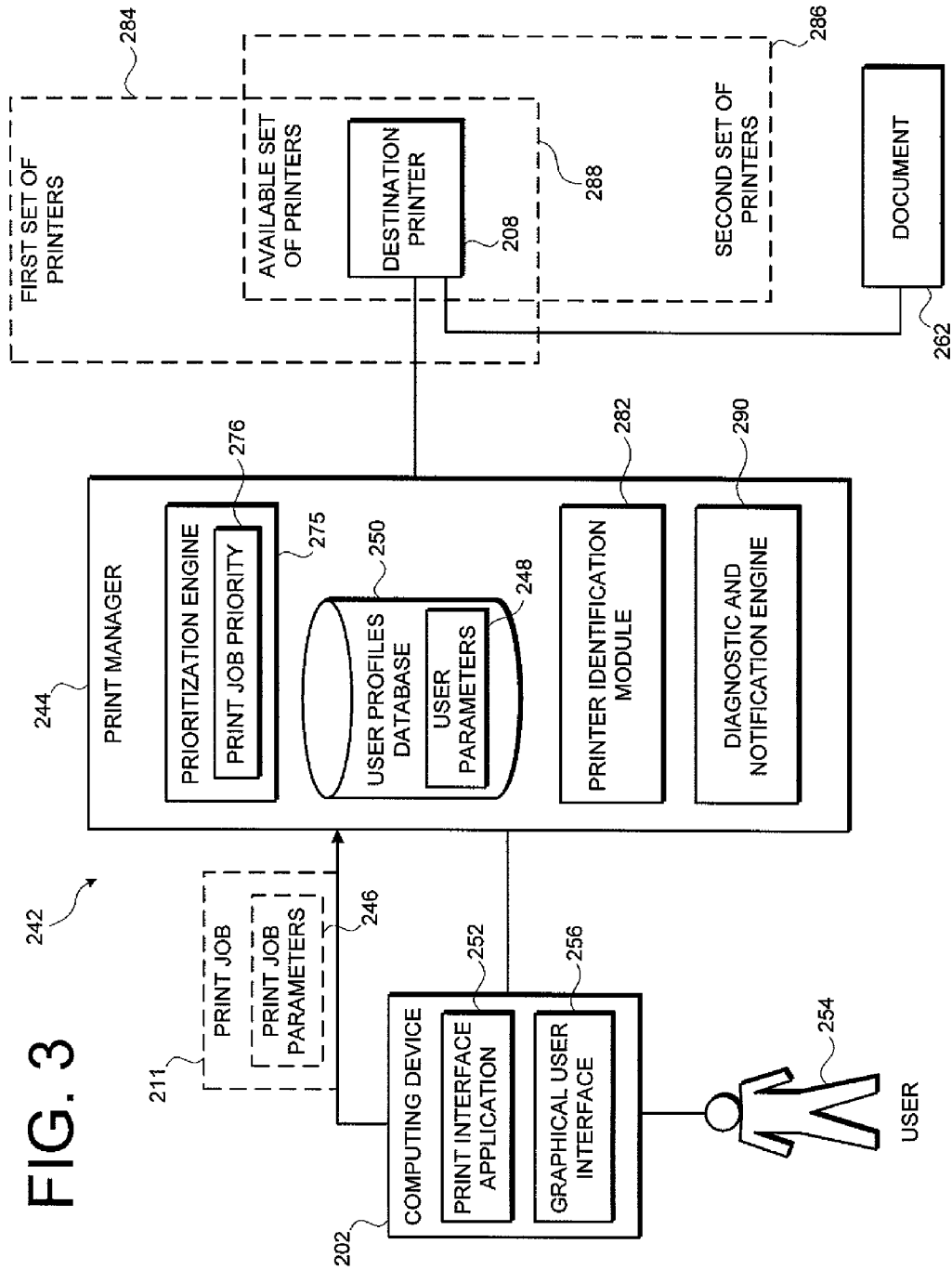
FIG. 3 is a schematic, block diagram of a print management system according to an illustrative embodiment.
Figure 8:
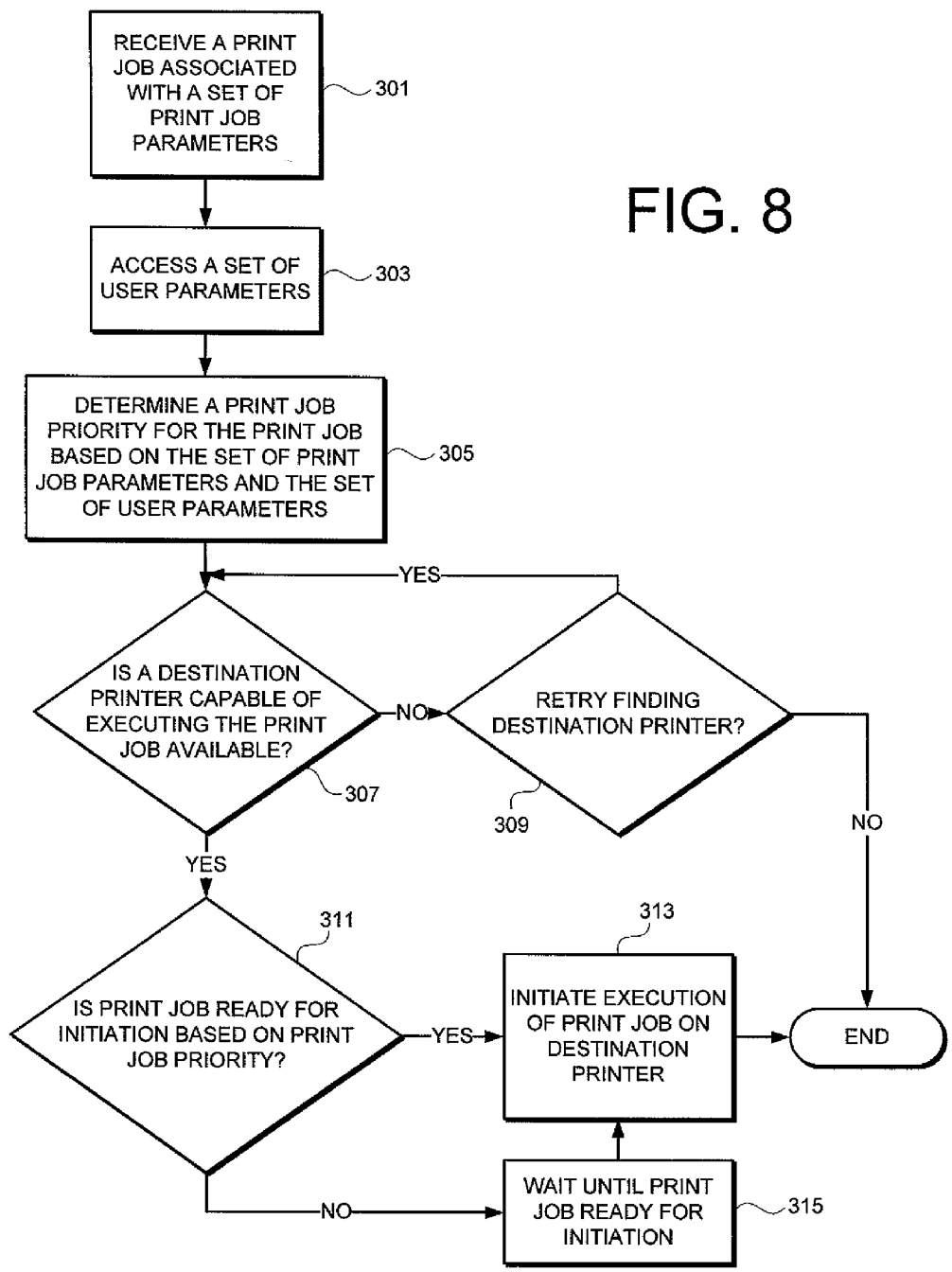
FIG. 8 is a schematic flowchart of a process for managing the execution of print jobs according to an illustrative embodiment.

Referring to FIG. 8, an illustrative embodiment of a process that may be executed by the print manager 244 in FIG. 3 includes receiving a print job associated with a set of print job parameters (step 301). The process accesses a set of user parameters (step 303), and determines a print job priority for the print job based on the set of print job parameters and the set of user parameters (step 305).

The process determines whether a destination printer capable of executing the print job is available (step 307). If the process determines that a destination printer capable of executing the print job is not available, the process determines whether to retry finding a destination printer (step 309). If the process determines to retry finding the destination printer, the process returns to step 307. If the process determines not to retry finding a destination printer, the process terminates.

Returning to step 307, if the process determines that a destination printer capable of executing the print job is available, the process determines if the print job is ready for initiation on the destination printer based on the print job priority (step 311). If the process determines that the print job is ready for initiation based on the print job priority of the print job, the process initiates execution of the print job on the destination printer (step 313).

If the process determines that the print job is not ready for initiation based on the print job priority of the print job, the process waits until the print job is ready for initiation (step 315). For example, in process 315, the process may analyze the execution order that has been determined based on print job priorities of pending print jobs, and wait until the print job is due to be scheduled based on this execution order. When the print job is ready to be executed, the process initiates execution of the print job on the destination printer (step 313). The process then terminates.

Figure 9:
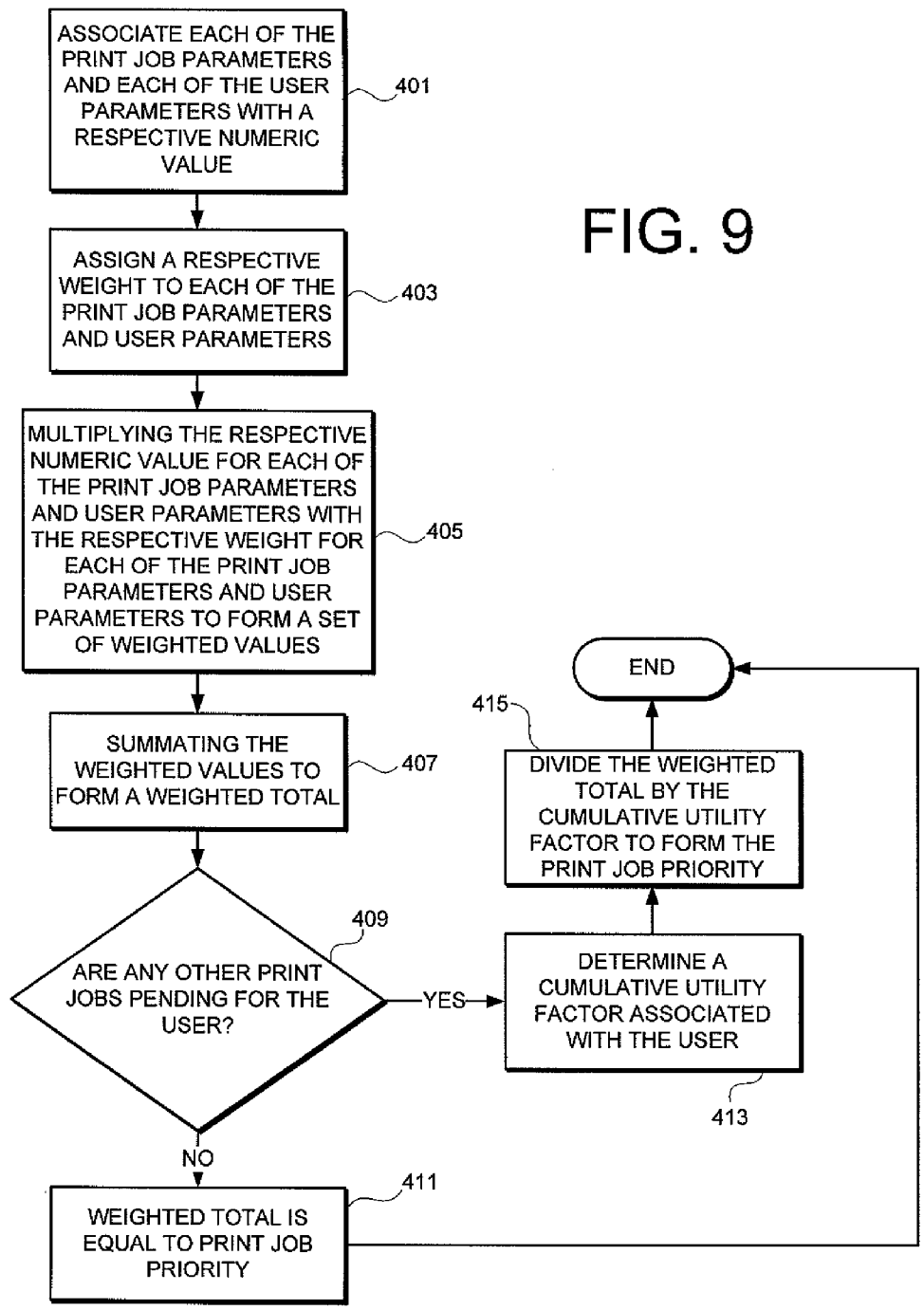
FIG. 9 is a schematic flowchart of a process for determining a print job priority according to an illustrative embodiment.

Referring to FIG. 9, an illustrative embodiment of a process for determining a print job priority for a print job, such as the process performed in step 305 of FIG. 8, may include associating each of the print job parameters and each of the user parameters with a respective numeric value (step 401). The process includes assigning a respective weight to each of the print job parameters and user parameters (step 403).

The process includes multiplying the respective numeric value for each of the print job parameters and user parameters with the respective weight for each of the print job parameters and user parameters to form a set of weighted values (step 405). The process includes summating the weighted values to form a weighted total (step 407). The process includes determining if there are other print jobs pending for the user (step 409). If the process determines that there are no other print jobs pending for the user, the process determines that the weighted total is equal to the print job priority (step 411). The process then terminates.

Returning to step 409, if the process determines that there are other print jobs pending for the user, the process determines a cumulative utility factor associated with the user (step 413). The process then divides the weighted total by the cumulative utility factor to form the print job priority (step 415). The process then terminates.

Figure 10:
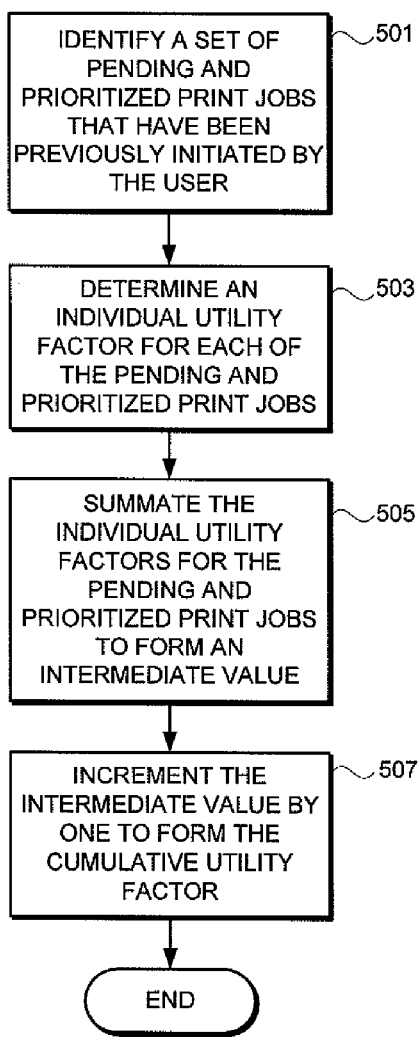
FIG. 10 is a schematic flowchart of a process for determining a cumulative utility factor according to an illustrative embodiment.

Referring to FIG. 10, an illustrative embodiment of a process for determining a cumulative utility factor, such as that performed by step 413 in FIG. 9, includes identifying a set of pending and prioritized print jobs that have been previously initiated by the user (step 501). The process determines an individual utility factor for each of the pending and prioritized print jobs (step 503). The process summates the individual utility factors for the pending and prioritized print jobs to form an intermediate value (step 505). The process increments the intermediate value by one (1) to form the cumulative utility factor (step 507). The process then terminates.

Figure 11:
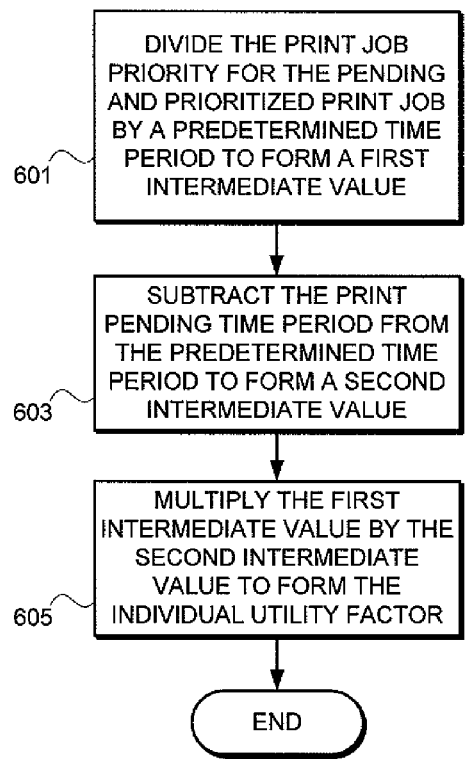
FIG. 11 is a schematic flowchart of a process for determining an individual utility factor according to an illustrative embodiment.

Referring to FIG. 11, an illustrative embodiment of a process for determining an individual utility factor, such as that performed by step 503 in FIG. 10, may include dividing the print job priority for the pending and prioritized print job by a predetermined time period to form a first intermediate value (step 601). The process subtracts the print pending time period from the predetermined time period to form a second intermediate value (step 603). The process multiplies the first intermediate value by the second intermediate value to form the individual utility factor (step 605). The process then terminates.

Figure 12:
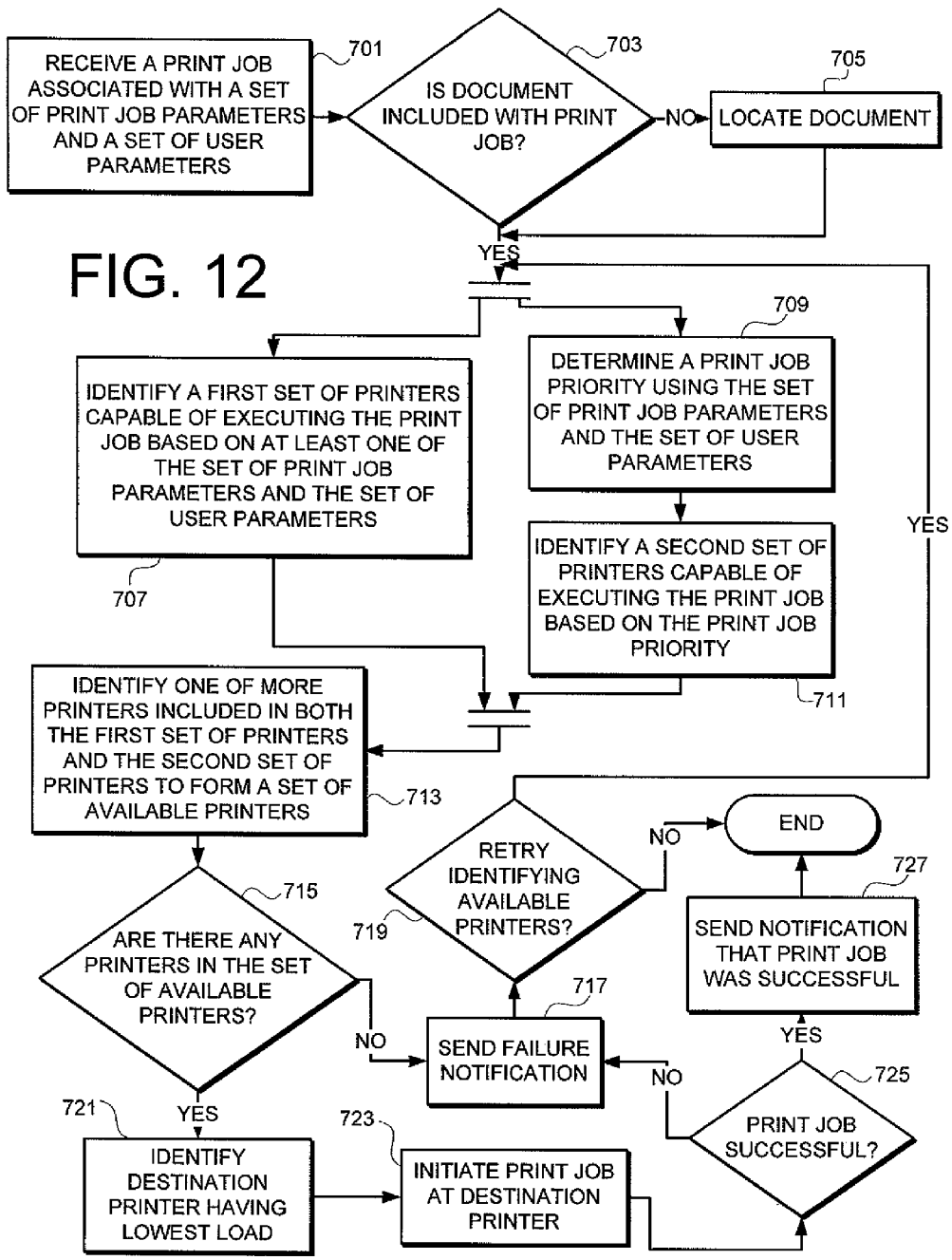
FIG. 12 is a schematic flowchart of a process for managing the execution of print jobs according to an illustrative embodiment.

Referring to FIG. 12, an illustrative embodiment of a process that may be executed by the print manager 244 in FIG. 3 includes receiving a print job associated with a set of print job parameters and a set of user parameters (step 701). The process determines whether the document is included with the print job (step 703). If the process determines that the document is included with the print job, the process proceeds to steps 707 and 709. Returning to step 703, if the process determines that the document is not included with the print job, the process locates the document (step 705). For example, the process may attempt to locate the document on any printer server, such as the printer server 110 in FIG. 1, or any other computing device. The process then proceeds to steps 707 and 709.

Steps 709 and 711 may be executed in parallel with step 707, as illustrated by the flowchart. However, in another embodiment, steps 709 and 711 may be executed in series with step 707. In step 707, the process identifies a first set of printers capable of executing the print job based on at least one of the set of print job parameters and the set of user parameters. In steps 709 and 711, the process determines a print job priority using the set of print job parameters and the set of user parameters, and identifies a second set of printers capable of executing the print job based on the print job priority.

The process identifies one or more printers included in both the first set of printers and the second set of printers to form a set of available printers (step 713). The process determines if there are any printers in the set of available printers (step 715). If the process determines that there are no printers in the set of the available printers, then the process sends a failure notification (step 717). The process then determines whether to retry identifying available printers (step 719). If the process determines not to retry identifying available printers, the process terminates. Returning to step 719, if the process determines to retry identifying available printers, the process returns to steps 707 and 709.

Returning to step 715, if the process determines that there are available printers in the set of available printers, the process identifies a destination printer having the lowest load within the set of available printers (step 721). The process initiates the print job at the destination printer (step 723). The process determines whether the print job was successfully executed (step 725). If the process determines that the print job was not successful, the process proceeds to step 717. Returning to step 725, if the process determines that the print job was successful, the process sends a notification indicating that the print job was successful (step 727). The process then terminates.

Figure 13:
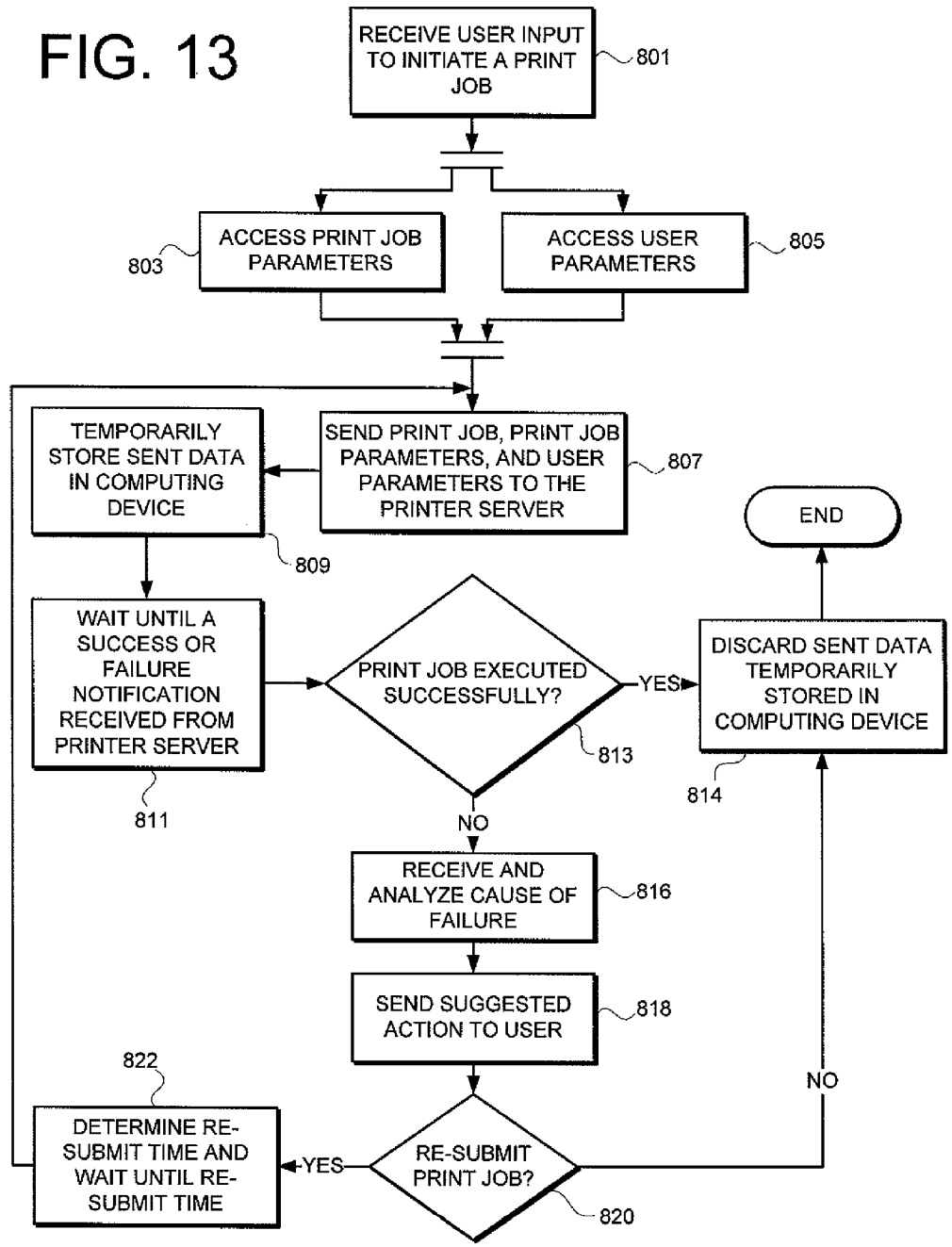
FIG. 13 is a schematic flowchart of a process for execution by a computing device that initiates print jobs.

Referring to FIG. 13, an illustrative embodiment of a process that may be implemented on a computing device, such as the computing devices 102 in FIG. 1 or the computing device 202 in FIG. 3, includes receiving user input to initiate a print job (step 801). The process may then perform steps 803 and 805 in series or in parallel, depending on the embodiment. In step 803, the process accesses print job parameters. In step 805, the process accesses user parameters. The process sends the print job, print job parameters, and user parameters to the printer server (step 807).

The process temporarily stores the sent data in the computing device (step 809). The process waits until a success or failure notification is received from the printer server (step 811). The process determines whether the print job was executed successfully (step 813). If the process determines that the print job was successfully executed, the process discards the sent data that is temporarily stored in the computing device (step 814). The process then terminates Returning to step 813, if the process determines that the print job was not successfully executed, the process receives and analyzes the cause of failure (step 816). In this embodiment, a diagnostic and notification engine, such as the diagnostic and notification engine 290 in FIG. 3, may be located in the computing device initiating the print job.

The process sends a suggested action to the user (step 818). The process determines whether to resubmit the print job (step 820). If the process determines not to resubmit the print job, the process discards the sent data that is temporarily stored in the computing device (step 814), and then terminates. Returning to step 820, if the process determines to resubmit the print job, the process determines a resubmit time and waits until the resubmit time (step 822). The process then returns to step 807.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 14:
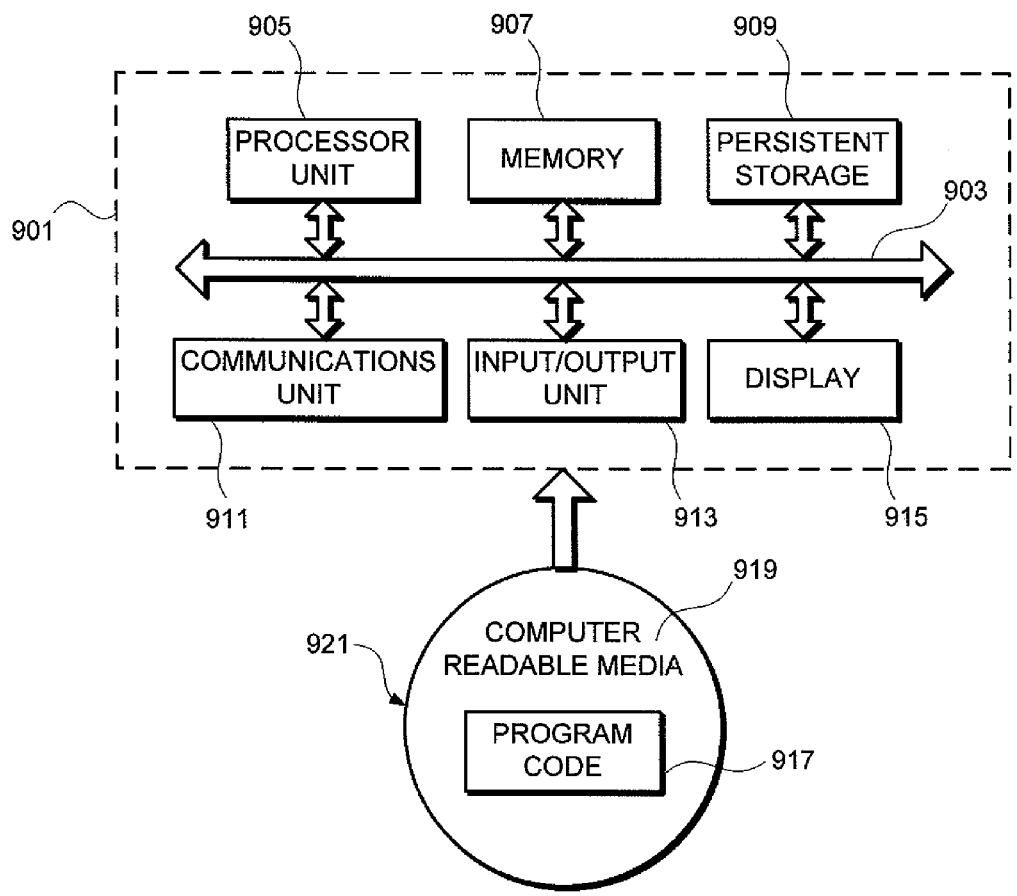
FIG. 14 is a schematic, block diagram of a data processing system in which the illustrative embodiments may be implemented.

Referring to FIG. 14, a block diagram of a data processing system 901 is shown in which illustrative embodiments may be implemented. In one embodiment, the data processing system 901 is an example of a printer server, such as the printer server 110 in FIG. 1, in which a print manager, such as the print manager 244 in FIG. 3, may be implemented. In another embodiment, the data processing system 901 is a computing device, such as one of the computing devices 102 in FIG. 1 or the computing device 202 in FIG. 3. Computer-usable program code or instructions implementing the processes used in the illustrative embodiments may be located on the data processing system 901. The data processing system 901 includes a communications fabric 903, which provides communications between a processor unit 905, a memory 907, a persistent storage 909, a communications unit 911, an input/output (I/O) unit 913, and a display 915.

The processor unit 905 serves to execute instructions for software that may be loaded into the memory 907. The processor unit 905 may be a set of one or more processors or may be a multi-processor core, depending on the particular implementation. Further, the processor unit 905 may be implemented using one or more heterogeneous processor systems in which a main processor is present with secondary processors on a single chip. As another illustrative example, the processor unit 905 may be a symmetric multi-processor system containing multiple processors of the same type.

The memory 907, in these examples, may be, for example, a random access memory or any other suitable volatile or non-volatile storage device. The persistent storage 909 may take various forms depending on the particular implementation. For example, the persistent storage 909 may contain one or more components or devices. For example, the persistent storage 909 may be a hard drive, a flash memory, a rewritable optical disk, a rewritable magnetic tape, or some combination of the above. The media used by the persistent storage 909 also may be removable. For example, a removable hard drive may be used for the persistent storage 909.

The communications unit 911, in these examples, provides for communications with other data processing systems or communication devices. In these examples, the communications unit 911 may be a network interface card. The communications unit 911 may provide communications through the use of either or both physical and wireless communication links.

The input/output unit 913 allows for the input and output of data with other devices that may be connected to the data processing system 901. For example, the input/output unit 913 may provide a connection for user input through a keyboard and mouse. Further, the input/output unit 913 may send output, such as a print job, to a printer. In the case in which the data processing system 901 is a cellular phone, the input/output unit 913 may also allow devices to be connected to the cellular phone, such as microphones, headsets, and controllers. The display 915 provides a mechanism to display information to a user, such as a graphical user interface.

Instructions for the operating system and applications or programs are located on the persistent storage 909. These instructions may be loaded into the memory 907 for execution by the processor unit 905. The processes of the different embodiments may be performed by the processor unit 905 using computer-implemented instructions, which may be located in a memory, such as the memory 907. These instructions are referred to as program code, computer-usable program code, or computer-readable program code that may be read and executed by a processor in the processor unit 905. The program code in the different embodiments may be embodied on different physical or tangible computer-readable media, such as the memory 907 or the persistent storage 909.

Program code 917 is located in a functional form on a computer-readable media 919 and may be loaded onto or transferred to the data processing system 901 for execution by the processor unit 905. The program code 917 and the computer-readable media 919 form computer program product 921 in these examples. In one embodiment, the computer program product 921 is a print manager, such as the print manager 244 in FIG. 3. In this embodiment, the data processing system 901 may be any server, and the program code 917 may include computer-usable program code capable of receiving a print job associated with a set of print job parameters. The print job is sent from a computing device associated with a user. The program code 917 may also include computer-usable program code capable of accessing a set of user parameters associated with the user, determining a print job priority for the print job using the set of print job parameters and the set of user parameters identifying a destination printer capable of executing the print job using the set of print job parameters, and initiating execution of the print job at the destination printer in response to determining to execute the print job based on the print job priority.

In another embodiment, the program code 917 may include computer-usable program code capable of receiving a print job associated with a set of print job parameters and a set of user parameters. The print job may be sent from a computing device associated with a user. The program code 917 may also include computer-usable program code capable of identifying a first set of printers capable of executing the print job based on at least one of the set of print job parameters and the set of user parameters, determining a print job priority based on the set of print job parameters and the set of user parameters, identifying a second set of printers capable of executing the print job based on the print job priority, and identifying one or more printers included in both the first set of printers and the second set of printers to form a set of available printers. Each of the set of available printers may have a respective load, and the respective load of each of the set of available printers is an amount of time remaining for the respective available printer to complete execution of print jobs scheduled for the respective available printer. The program code 917 may also include computer-usable program code capable of identifying a destination printer having a lowest load in the set of available printers, and initiating execution of the print job at the destination printer.

In one example, the computer-readable media 919 may be in a tangible form, such as, for example, an optical or magnetic disc that is inserted or placed into a drive or other device that is part of the persistent storage 909 for transfer onto a storage device, such as a hard drive that is part of the persistent storage 909. In a tangible form, the computer-readable media 919 also may take the form of a persistent storage, such as a hard drive or a flash memory that is connected to the data processing system 901. The tangible form of the computer-readable media 919 is also referred to as computer recordable storage media.

Alternatively, the program code 917 may be transferred to the data processing system 901 from the computer-readable media 919 through a communication link to the communications unit 911 or through a connection to the input/output unit 913. The communication link or the connection may be physical or wireless in the illustrative examples. The computer-readable media 919 also may take the form of non-tangible media, such as communication links or wireless transmissions containing the program code 917.

The different components illustrated for the data processing system 901 are not meant to provide architectural limitations to the manner in which different embodiments may be implemented. The different illustrative embodiments may be implemented in a data processing system including components in addition to or in place of those illustrated for data processing system 901. Other components shown in FIG. 14 can be varied from the illustrative examples shown.

As one example, a storage device in the data processing system 901 is any hardware apparatus that may store data. The memory 907, the persistent storage 909, and the computer-readable media 919 are examples of storage devices in a tangible form.

In another example, a bus system may be used to implement the communications fabric 903 and may be comprised of one or more buses, such as a system bus or an input/output bus. Of course, the bus system may be implemented using any suitable type of architecture that provides for a transfer of data between different components or devices attached to the bus system. Additionally, the communications unit 911 may include one or more devices used to transmit and receive data, such as a modem or a network adapter. Further, a memory may be, for example, the memory 907 or a cache such as found in an interface and memory controller hub that may be present in the communications fabric 903.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method, comprising:
   determining a print job priority for a print job using a set of print job parameters and a set of user parameters;
   initiating a notification on a computing device that the print job is executed at a destination printer;
   wherein the determining the print job priority comprises:
   assigning a respective weight to each of the set of print job parameters and each of the set of user parameters;
   multiplying a respective numeric value for each of the set of print job parameters and each of the set of user parameters with the respective weight for each of the set of print job parameters and each of the set of user parameters to form a set of weighted values;
   summating the set of weighted values to form a weighted total;
   determining a cumulative utility factor;
   dividing the weighted total by the cumulative utility factor to form the print job priority;
   identifying the destination printer is capable of executing the pint job using the set of print job parameters; and
   initiating execution of the print job at the destination printer responsive to determining to execute the print job based on the print job priority.

2. The method of claim 1 further comprising at least one of:
   receiving the print job associated with the set of print job parameters, the print job sent from the computing device associated with a user; and
   accessing the set of user parameters associated with the user.

3. The method of claim 1, wherein at least one of the respective weights are dynamically adjusted based on at least one of the set of print job parameters and the set of user parameters.

4. The method of claim 1, further comprising at least one of:
   assigning the respective weight to each of the set of print job parameters and each of the set of user parameters;
   multiplying the respective numeric value for each of the set of print job parameters and each of the set of user parameters with the respective weight for each of the set of print job parameters and each of the set of user parameters to form the set of weighted values;
   adding each weighted value in the set of weighted values to form the weighted total;
   determining the cumulative utility factor, wherein determining the cumulative utility factor comprises:
   identifying a set of pending and prioritized print jobs initiated by a user during a predetermined time period,
   determining an individual utility factor for each of the set of pending and prioritized print jobs initiated by the user, wherein determining the individual utility factor for each of the set of pending and prioritized print jobs comprises:
   determining a first intermediate value by dividing the print job priority for a pending and prioritized print job by the predetermined time period,
   determining a second intermediate value by subtracting a print pending time period from the predetermined time period, wherein the print pending time period is an amount of time the print job has been pending, and
   multiplying the first intermediate value by the second intermediate value to form the individual utility factor,
   determining a third intermediate value by summating the individual utility factor[s] for each of the set of pending and prioritized print jobs, and
   incrementing the third intermediate value by one to form the cumulative utility factor; and
   dividing the weighted total by the cumulative utility factor to form the print job priority.

5. The method of claim 1, further comprising at least one of:
   assigning the respective weight to each of the set of print job parameters and each of the set of user parameters;
   multiplying the respective numeric value for each of the set of print job parameters and each of the set of user parameters with the respective weight for each of the set of print job parameters and each of the set of user parameters to form the set of weighted values;
   adding each weighted value in the set of weighted values to form the weighted total;
   determining the cumulative utility factor, wherein determining the cumulative utility factor comprises:
   identifying a set of pending and prioritized print jobs initiated by a user during a predetermined time period,
   determining an individual utility factor for each of the set of pending and prioritized print jobs initiated by the user, wherein determining the individual utility factor for each of the set of pending and prioritized print jobs comprises:
   determining a first intermediate value by dividing the print job priority for a pending and prioritized print job by the predetermined time period,
   determining a second intermediate value by identifying an amount of time remaining until the pending and prioritized print job has been pending for the predetermined time period, and multiplying the first intermediate value by the second intermediate value to form the individual utility factor, determining a third intermediate value by summating the individual utility factor[s] for each of the set of pending and prioritized print jobs, and incrementing the third intermediate value by one to form the cumulative utility factor; and dividing the weighted total by the cumulative utility factor to form the print job priority.

6. The method of claim 1, further comprising at least one of:

determining that the print job is the only print job currently pending for a user;

assigning the respective weight to each of the set of print job parameters and each of the set of user parameters;

multiplying the respective numeric value for each of the set of print job parameters and each of the set of user parameters with the respective weight for each of the set of print job parameters and each of the set of user parameters to form the set of weighted values; and adding each weighted value in the set of weighted values to form the print job priority.

7. The method of claim 1, further comprising at least one of:

determining the weighted total for the print job based on a set of numeric values and weights associated with each of the set of print job parameters and each of the set of user parameters;

determining the cumulative utility factor based on print jobs previously initiated by a user; and dividing the weighted total by the cumulative utility factor to form the print job priority.

8. The method of claim 2, wherein accessing the set of user parameters associated with the user comprises receiving the set of user parameters from the computing device.

9. The method of claim 2, wherein accessing the set of user parameters associated with the user comprises accessing a user profile database, the user profile database comprising the set of user parameters.

10. The method of claim 2, wherein identifying the destination printer further comprises identifying the destination printer based on the set of print job parameters and the set of user parameters.

11. The method of claim 1, wherein the print job is one of a set of pending print jobs, each of the set of pending print jobs having a respective print job priority, further comprising comparing the respective print job priority of the set of pending print jobs to determine an execution order for the set of pending print jobs.

12. A non-transitory computer readable medium comprising instructions that when read by a processor cause the processor to perform:

determining a print job priority for a print job using a set of print job parameters and a set of user parameters;

initiating a notification on a computing device that the print job is executed at a destination printer;

wherein the determining the print job priority comprises:

assigning a respective weight to each of the set of print job parameters and each of the set of user parameters;

multiplying a respective numeric value for each of the set of print job parameters and each of the set of user parameters with the respective weight for each of the set of print job parameters and each of the set of user parameters to form a set of weighted values;

summating the set of weighted values to form a weighted total;

determining a cumulative utility factor;

dividing the weighted total by the cumulative utility factor to form the print job priority;

identifying the destination printer is capable of executing the print job using the set of print job parameters; and initiating execution of the print job at the destination printer responsive to determining to execute the print job based on the print job priority.

13. The non-transitory computer readable medium of claim 12, wherein the processor further performs at least one of:

receiving the print job associated with the set of print job parameters, the print job sent from the computing device associated with a user; and accessing the set of user parameters associated with the user.

14. The non-transitory computer readable medium of claim 12, wherein the processor further performs dynamically adjusting at least one of the respective weights based on at least one of the set of print job parameters and the set of user parameters.

15. The non-transitory computer readable medium of claim 13, wherein accessing the set of user parameters associated with the user comprises receiving the set of user parameters from the computing device.

16. The non-transitory computer readable medium of claim 13, wherein accessing the set of user parameters associated with the user comprises accessing a user profile database, the user profile database comprising the set of user parameters.

17. The non-transitory computer readable medium of claim 13, wherein identifying the destination printer further comprises identifying the destination printer based on the set of print job parameters and the set of user parameters.

18. The non-transitory computer readable medium of claim 12, wherein the print job is one of a set of pending print jobs, each of the set of pending print jobs having a respective print job priority.

19. The non-transitory computer readable medium of claim 18, wherein the processor further performs comparing the respective print job priority of the set of pending print jobs to determine an execution order for the set of pending print jobs.

20. A method, comprising:

determining a print job priority for a print job using a set of print job parameters and a set of user parameters;

wherein the determining the print job priority comprises:

assigning a respective weight to each of the set of print job parameters and each of the set of user parameters;

multiplying a respective numeric value for each of the set of print job parameters and each of the set of user parameters with the respective weight for each of the set of print job parameters and each of the set of user parameters to form a set of weighted values;

summating the set of weighted values to form a weighted total;

determining a cumulative utility factor;

dividing the weighted total by the cumulative utility factor to form the print job priority;

identifying a destination printer capable of executing the print job using the set of print job parameters; and initiating execution of the print job at the destination printer responsive to determining to execute the print job based on the print job priority.

* * * * *